United States Patent
Scott et al.

(10) Patent No.: US 11,481,190 B2
(45) Date of Patent: Oct. 25, 2022

(54) SELECTING A PLURALITY OF PROCESSING SYSTEMS TO SORT A DATA SET

(71) Applicant: INTERNATIONAL BUSINESS MACHINES CORPORATION, Armonk, NY (US)

(72) Inventors: Michael R. Scott, Ocean View, HI (US); Ronald David Boenig, II, Denver, CO (US); David C. Reed, Tucson, AZ (US); Samuel Ryan Smith, Vail, AZ (US)

(73) Assignee: INTERNATIONAL BUSINESS MACHIINES CORPORATION, Armonk, NY (US)

(*) Notice: Subject to any disclaimer, the term of this patent is extended or adjusted under 35 U.S.C. 154(b) by 215 days.

(21) Appl. No.: 16/882,437

(22) Filed: May 22, 2020

(65) Prior Publication Data

US 2021/0365238 A1 Nov. 25, 2021

(51) Int. Cl.
| | |
|---|---|
| G06F 16/20 | (2019.01) |
| G06F 7/36 | (2006.01) |
| G06F 9/54 | (2006.01) |
| G06F 16/27 | (2019.01) |

(52) U.S. Cl.
CPC ............... *G06F 7/36* (2013.01); *G06F 9/542* (2013.01); *G06F 16/278* (2019.01)

(58) Field of Classification Search
None
See application file for complete search history.

(56) References Cited

U.S. PATENT DOCUMENTS

| | | | |
|---|---|---|---|
| 5,416,921 A | 5/1995 | Frey et al. | |
| 8,214,194 B2 | 7/2012 | Bank et al. | |
| 8,458,714 B2 | 6/2013 | King et al. | |
| 8,695,011 B2 | 4/2014 | Flemming et al. | |
| 9,672,072 B1 | 6/2017 | Peeters et al. | |
| 10,108,459 B2 | 10/2018 | Williams et al. | |
| 10,148,743 B2 | 12/2018 | Birkestrand et al. | |
| 2015/0261570 A1* | 9/2015 | Goldman | G06F 9/50 718/102 |
| 2016/0078361 A1* | 3/2016 | Brueckner | H04L 67/10 706/12 |
| 2016/0124900 A1* | 5/2016 | Balakrishnan | G06F 15/7885 712/18 |
| 2018/0129529 A1* | 5/2018 | Boenig, II | G06F 11/3442 |
| 2018/0157694 A1* | 6/2018 | Boehme | G06F 16/2282 |
| 2018/0246761 A1 | 8/2018 | Burdick et al. | |
| 2018/0293109 A1 | 10/2018 | Hofbauer et al. | |
| 2020/0050522 A1* | 2/2020 | Coleman | G06F 11/2041 |
| 2020/0074690 A1* | 3/2020 | Fukagai | G06V 10/82 |

* cited by examiner

*Primary Examiner* — Jau Shya Meng
(74) *Attorney, Agent, or Firm* — Konrad Raynes Davda & Victor LLP; David W. Victor

(57) ABSTRACT

Provided are a computer program product, system, and method for selecting a plurality of processing systems to sort a data set. A determination is made of processing systems to perform a sort of records in a data set. The data set is divided into data subsets, each data subset comprising a portion of the records of the data set. Each of the determined processing systems of is notified of a data subset to sort. In response to receiving notification from the determined processing systems that the records in the data subsets have been sorted, the sorted data subsets are merged into a sorted data set comprising the records of the data set sorted.

20 Claims, 7 Drawing Sheets

SELECTING A PLURALITY OF PROCESSING SYSTEMS TO SORT A DATA SET

BACKGROUND OF THE INVENTION

1. Field of the Invention

The present invention relates to a computer program product, system, and method for selecting a plurality of processing systems to sort a data set.

2. Description of the Related Art

A sort operation, such as the International Business Machines Corporation ("IBM") DFSORT operation, will sort the records in a very large data set into output sets and then merge them back into a fully sorted data set. The DFSORT operation consumes a substantial amount of computational resources, including memory and processor cycles, to compare records in the data set to sort, create work data sets to store data temporarily for the sort, and create input and output data sets. Systems allow workload balancing among jobs in a multi-processing system to distribute an entire job to a processing system in a multi-processing system environment based on its resource usage.

There is a need in the art for improved computer technology for sorting a data set in a multi-processing system.

SUMMARY

Provided are a computer program product, system, and method for selecting a plurality of processing systems to sort a data set. A determination is made of processing systems to perform a sort of records in a data set. The data set is divided into data subsets, each data subset comprising a portion of the records of the data set. Each of the determined processing systems of is notified of a data subset to sort. In response to receiving notification from the determined processing systems that the records in the data subsets have been sorted, the sorted data subsets are merged into a sorted data set comprising the records of the data set sorted.

DETAILED DESCRIPTION

Described embodiments provide improvements to the computer technology for sorting a data set in a multi-processing system environment by dividing a data set to sort into multiple data subsets to be sorted by the different processing systems. The sorted data subsets may be stored in shared storage used by the processing systems and then copied into the processing system local memory for sorting. The sorted data subsets in the shared storage may then be merged into a sorted data set.

Further, described embodiments provide improvements to computer technology for handling a processing system assigned to sort a data subset becoming unavailable. If a processing system becomes unavailable for having low available computational resources or for other reasons, then the partially completed data subset being sorted by the unavailable processing system may be divided into further partial data subsets for sorting by one or more other processing systems depending on their available computational resources. By dividing the partially completed data subset into partial data subsets, the sort job of the remaining partially completed data subset may be sorted by multiple processing systems that may not have sufficient available computational resources to satisfy a computational resource threshold needed to sort a full data subset.

The described embodiments allow dynamic change to the allocation of processing systems in a multi-processing system environment based on the available computational resources of the processing systems.

Figure 1:
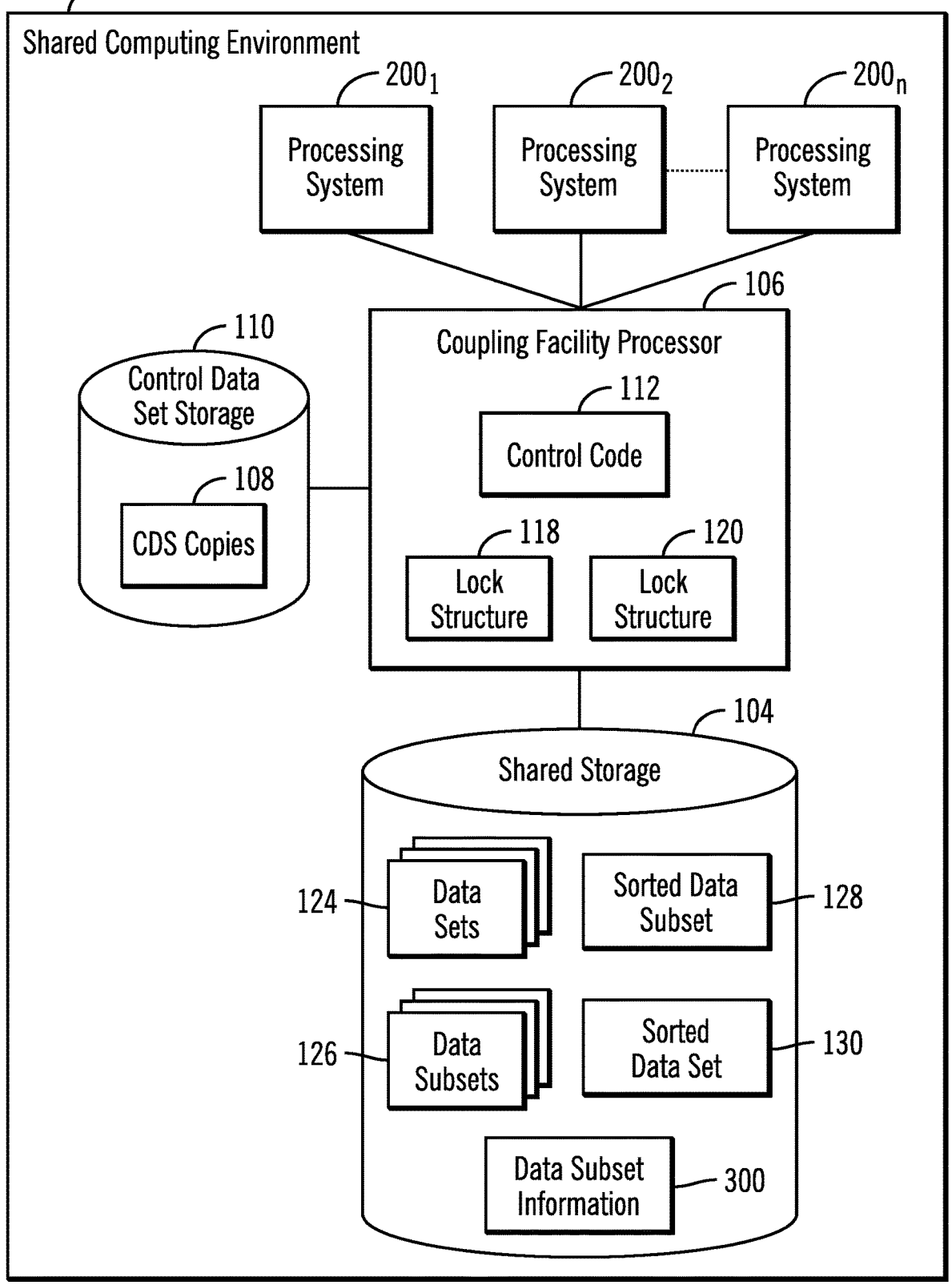
FIG. 1 illustrates an embodiment of a shared storage computing environment.

FIG. 1 illustrates an embodiment of a shared computing environment 100 including a plurality of processing systems $200_1, 200_2 \ldots 200_n$, each implementing a separate operating system to access shared storage 104 via a coupling facility 106 (or other type of server) that manages shared access to the shared storage 104. The coupling facility 106 maintains a control data set having information to maintain data integrity of records in data sets 124 in the shared storage 104 and to manage data sharing, such as record level sharing, among the processing systems $200_1, 200_2 \ldots 200_n$. The coupling facility 106 maintains control data set copies 108 in a control data set storage 110, which may be at different version levels.

The coupling facility 106 has control code 112, comprising an operating system and other programs, to manage access to the shared storage 104. The control code 112 includes an update manager to manage updates to the control data set copies 108. The coupling facility 106 includes a cache 118 to store shared data and control block structures for the processing systems $200_1, 200_2 \ldots 200_n$ and a lock structure 120 having global locks to serialize access at record level.

The shared storage 104 may store data sets 124 comprising records of data, data subsets 126 comprised of portions of records of one data set 124 that are generated to distribute among the processing systems $200_1, 200_2 \ldots 200_n$ to sort the records in the data subsets 126 according to an index value to produce sorted data subsets 128. The sorted data subsets 128 may then be merged into a sorted data set 130. The shared storage 104 further stores data subset information 300 having information on the data subsets 126 to manage the parallel sort processing of the data subsets 124 by the multiple processing systems $200_1, 200_2 \ldots 200_n$.

The processing systems $200_1, 200_2 \ldots 200_n$ and coupling facility 106 may be implemented in separate computing or hardware devices, or comprise virtual servers, such as Logical Partitions (LPARs). In one implementation where the computing environment 100 comprises a Parallel Sysplex® from International Business Machines Corporation ("IBM"), the shared storage may comprise Virtual Storage Access Method (VSAM) data sets; the control data sets copies 108 may comprise Sharing Control Data Sets (SHCDs) providing critical information used for record level sharing of the VSAM data sets, including a list of subsystems and their status, open data sets using the coupling facility 106, etc.; the SHCD copies may include active and spare copies, such as two sets of two active copies and one spare copy, or multiple copies; the processing systems $200_1$, $200_2$ ... $200_n$ may include the Z/OS® operating system having an SMSVSAM address space to coordinate sharing. (Z/OS and Parallel Sysplex are registered trademarks of IBM throughout the world).

In alternative embodiments, the shared computing system be implemented in systems and shared computing environments from other vendors using different technology to coordinate processing among the multiple processing systems and to share data sets in storage 104.

The storages 104 and 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storages 104 and 110 may comprise heterogeneous storage devices from different vendors and different types of storage devices, such as a first type of storage devices, e.g., hard disk drives, that have a slower data transfer rate than a second type of storage devices, e.g., SSDs.

Figures 2, 3:
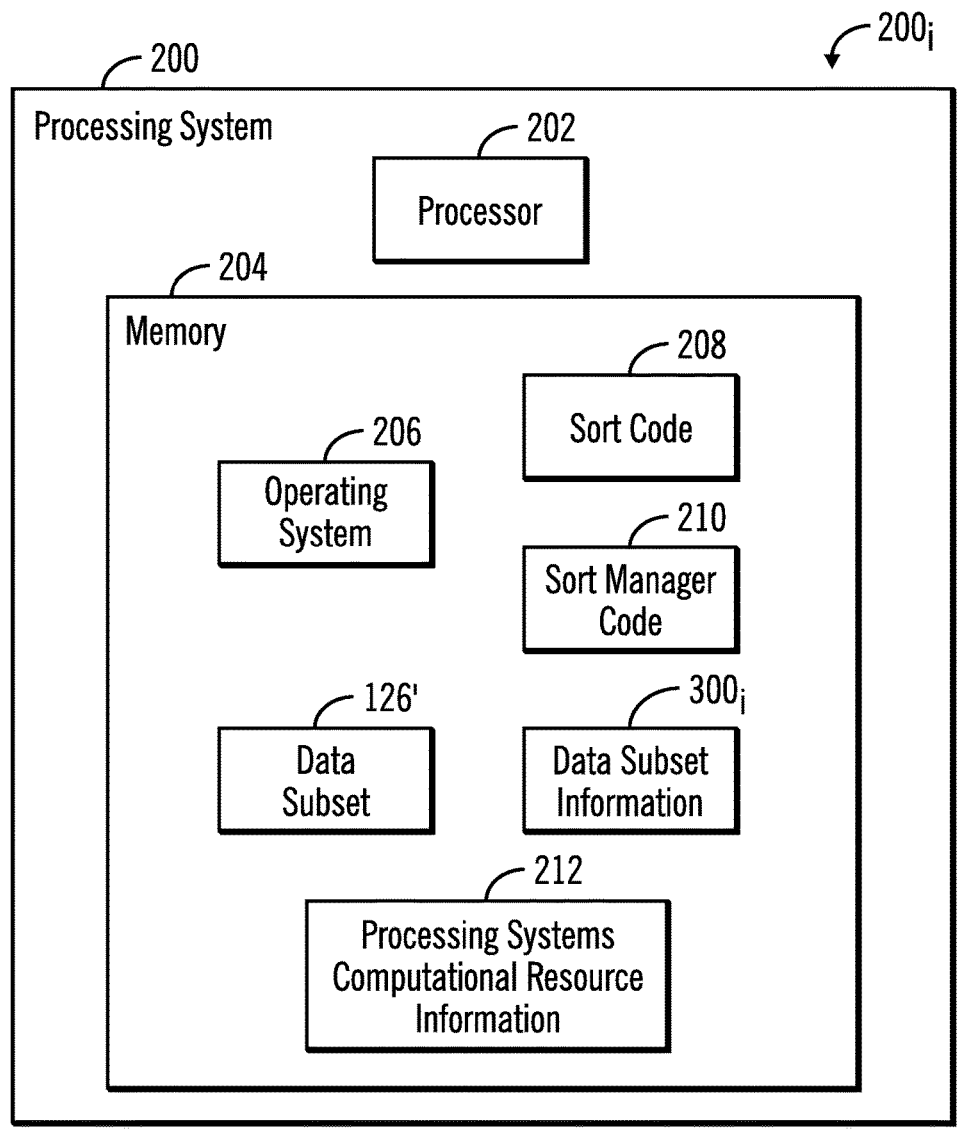
FIG. 2 illustrates an embodiment of a processing system in the shared storage computing environment.
FIG. 3 illustrates an embodiment of data subset information.

FIG. 2 illustrates an embodiment of a processing system $200_i$ comprising one of the processing systems $200_1$, $200_2$ ... $200_n$, and includes a processor 202 and a memory 204 including programs executed by the processor 202. The memory 204 includes an operating system 206, such as a Z/OS operating system; sort code 208 executed to perform a sort operation on a data set 124; sort manager code 210, executed in a sort manager processing system $200_M$ of the processing systems $200_1$, $200_2$ ... $200_n$, to manage other of the processing systems $200_1$, $200_2$ ... $200_n$ to sort data subsets 126 of a data set 124; a copy of a data subset 126 in the memory 104 stored locally in the memory 204 as data subset 126' by the sort code 208 to sort; a copy of data subset information $300_i$ of the data subset 126' being sorted by the sort code 208; and processing systems computational resource information 212 maintained by the sort manager processing system $200_M$ to maintain information on available computational resources in the processing systems $200_1$, $200_2$ ... $200_n$, such as information on available local memory 204 and processor 202 resources.

Each of the processing systems $200_1$, $200_2$ ... $200_n$ may include the sort code 208 and sort manager code 210 to function as both the sort manager processing system $200_M$ and a sort processing system $200_i$ selected to sort a data subset 126. The sort code 208 and sort manager code 210 may be part of the operating system 206, such as part of the DFSORT module, or implemented in separate sort applications.

FIG. 3 illustrates an embodiment of data subset information $300_i$ maintained for each data subset 126 of records of a data set 124 to have processed by one of the processing systems $200_1$, $200_2$ ... $200_n$, and includes: a sequence number 302 of the data subset of the data subsets 126 within the data set 124 being sorted; a data subset location 304 in the shared storage 104 of where the data subset 124 to sort is located; a sorted data subset location 306 in the shared storage 104 of where the sorted data subset 128 is stored; a record range of the data subset 308 comprising a range of records from the data set 124 in the data subset 302; sorting work-in-progress data structures 310 generated by the sort code 208, such as work data sets allocated for an IBM Blockset or Peerage/Vale sort technique, partitions of the data subset 128 that the sort code 208 recursively creates, such as by using a divide and conquer Quicksort algorithm, control fields, and other data structures generated during the sort procedure, such as a DFSORT or Quicksort or other sorting algorithms; an assigned processing system 312 assigned to process the data subset 302; and a status 314 of the sort operation, such as complete, failed or pending.

Figure 4:
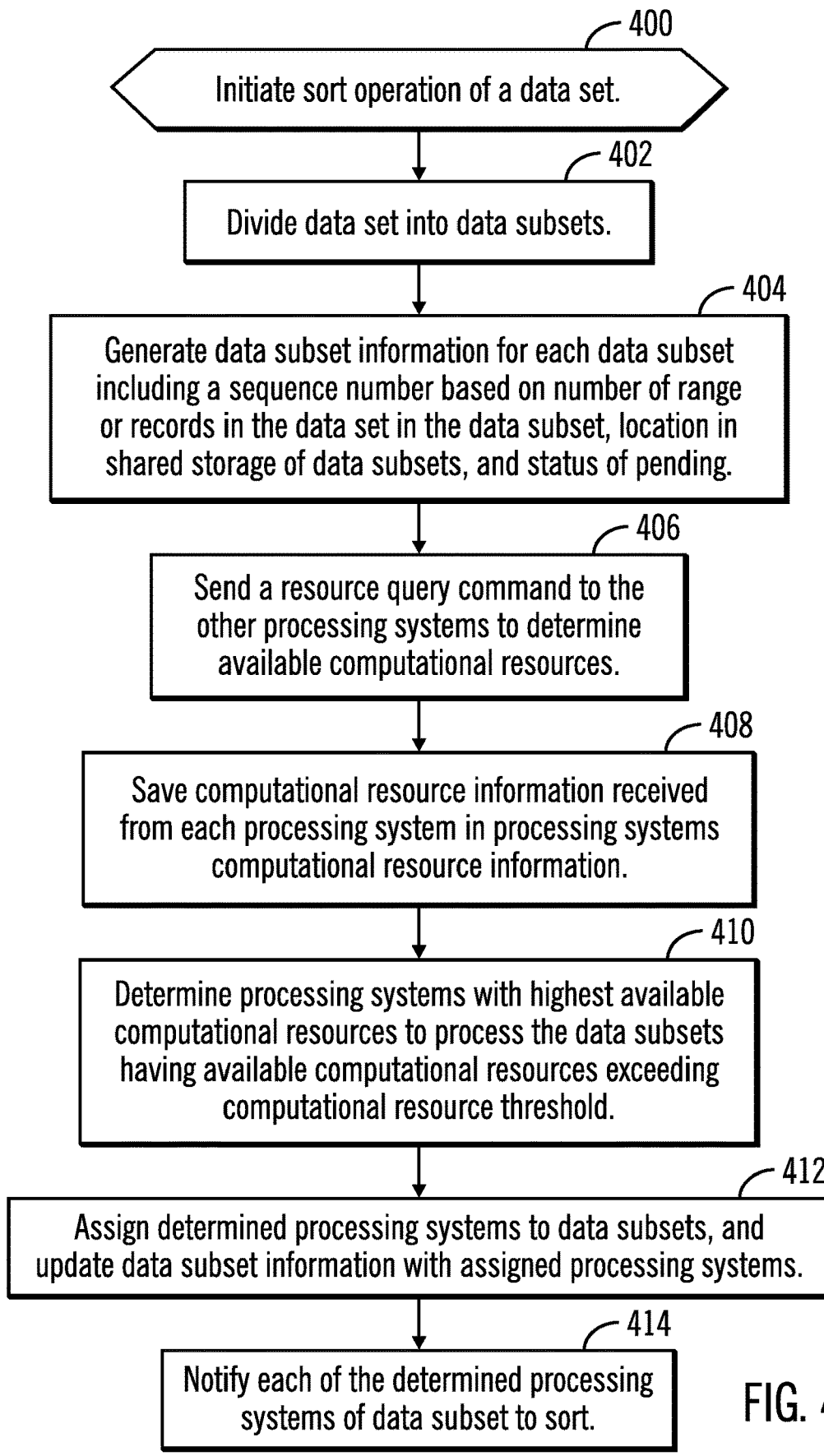
FIG. 4 illustrates an embodiment of operations to initiate a sort of a data set by a sort manager processing system.

FIG. 4 illustrates an embodiment of operations performed by a sort manager processing system $200_M$ executing the sort manager code 210 to perform a sort operation of a data set 124. Upon initiating (at block 400) a sort operation, the sort manager processing system $200_M$ divides (at block 402) the data set 124 into data subsets 126 comprising subsets of records of the data set 124. Data subset information $300_i$ is generated (at block 404) for each data subset 126 including a sequence number 302 based on the number of range or records in the data set 124 in the data subset 126 represented by the information $300_i$; location 304 in shared storage 104 of data subset 302, and a status 314 of pending. The sort manager processing system $200_M$ sends (at block 406) a resource query command to the other processing systems $200_1$, $200_2$ ... $200_n$ to determine available computational resources. The computational resource information received from each processing system $200_i$ is saved (at block 408) in processing systems computational resource information 212. The sort manager processing system $200_M$ determines (at block 410), from the processing systems computational resource information 212, processing systems $200_i$ with highest available computational resources to process the data subsets 126 that have available computational resources exceeding a computational resource threshold. The computational resource threshold may indicate minimum optimal resources to sort an entire data subset 126. The determined processing systems $200_i$ are assigned the data subsets 126 and the data subset information $300_i$ for each of the data subsets 126 is updated (at block 412) with the assigned processing system $200_i$ in assignment field 312. Each of the determined processing systems $200_i$ are notified (at block 414) of the data subset 126 assigned to sort.

With the embodiment of FIG. 4, a data set 124 to sort is divided into multiple data subsets 126 that may then be assigned to different processing systems $200_1$, $200_2$ ... $200_n$ based on their resource availability to allow for parallel processing of the sort operation.

Figure 5:
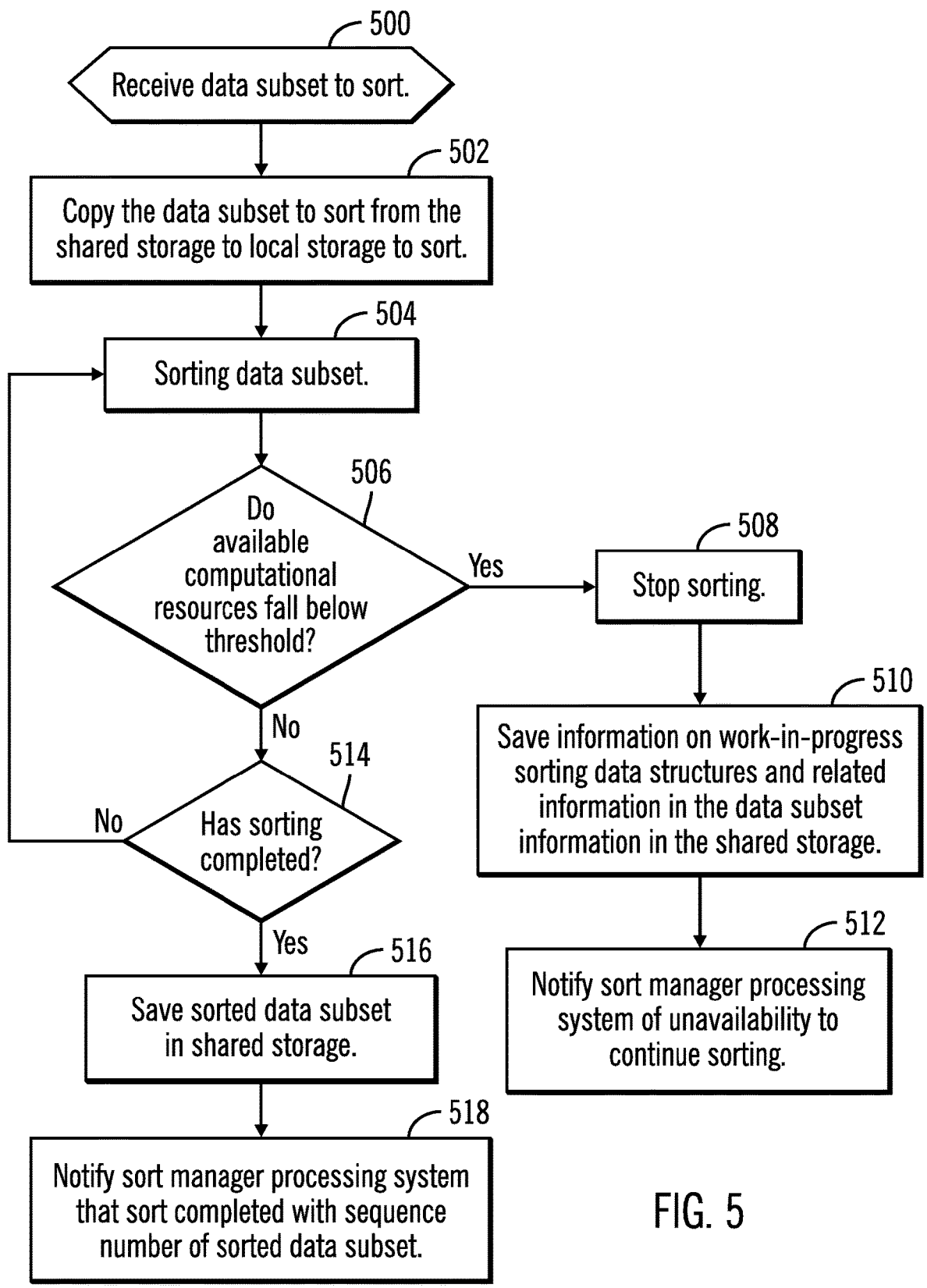
FIG. 5 illustrates an embodiment of operations performed by a processing system receiving a data subset to sort for the data set.

FIG. 5 illustrates an embodiment of operations performed by a processing system $200_i$ assigned to sort a data subset 126 executing the sort code 208. Upon receiving (at block 600) a data subset 126 to sort, the processing system $200_i$ may copy (at block 502) the data subset 126 to sort from the shared storage 104 to a local storage in the processing system $200_i$. The data subset 126 is then sorted (at block 504) using a sort technique, such as the IBM Blockset, quicksort, etc. If (at block 506) during the sort the processing system $200_i$ determines that available computational resources fall below a threshold, then sorting is stropped (at block 508) and information on work-in-progress data structures and related sorting information is saved (at block 510) as 310 in data subset information $300_i$ for the data subset. The data subset information $300_i$ may also be updated in the shared storage 104. The sort manager processing system $200_M$ is notified (at block 512) of the processing system unavailability to continue sorting due to low available computational resources or some other failure.

If (at block 506) there are sufficient available computational resources to continue sorting, and if (at block 514) sorting has completed, then the sorted data subset 128 is saved (at block 516) in the shared storage 104. The sort manager processing system $200_M$ is notified (at block 518) that the sort of the data subset having the sequence number 302 is completed. The status field 314 in the data subset information $300_i$ for the sorted data subset 126 may then be set to completed. If (at block 514) sorting has not completed, then control proceeds back to block 504 to continue the sorting of the data subset 126.

With the embodiment of operations of FIG. 5, the processing system $200_i$ sorting a data subset will independently perform the sorting with respect to other processing systems sorting data subsets 126 until the sorting is completed or the sort operation failed due to available computational resources at the sorting processing system $200_i$ falling below a computational resource threshold or for some other reason.

Figure 6:
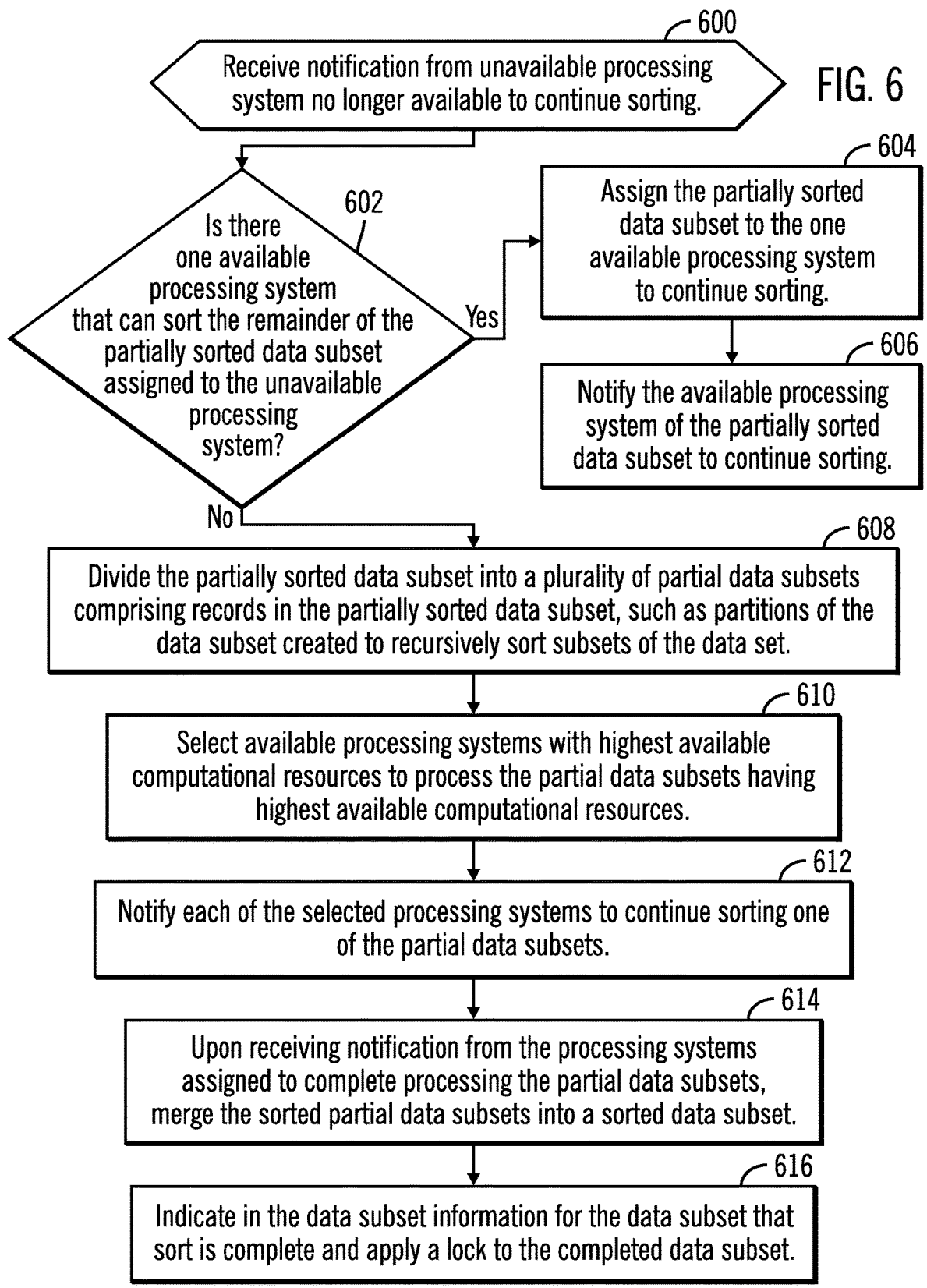
FIG. 6 illustrates an embodiment of operations performed by the sort manager processing system to process a notification from a processing system no longer available to continue sorting a data subset.

FIG. 6 illustrates an embodiment of operations performed by the sort manager processing system $200_M$ executing the sort manager code 210 to process a notification from a processing system $200_U$ assigned to process a data subset 126 that it is unavailable to process the assigned data subset 126. Upon receiving (at block 600) the notification from an unavailable processing system $200_U$, the sort manager processing system $200_M$ determines (at block 602) whether there is one available processing system $200_j$ that can sort the remainder of the partially sorted data subset assigned to the unavailable processing system $200_U$. The determination may be based on whether one available processing system $200_j$ has a threshold amount of computational resources to sort a data subset 126. If (at block 602) there is one available processing system $200_i$, then the partially sorted data subset 126 is assigned (at block 604) to the determined available processing system $200_i$ to continue the sorting, which assignment includes updating the assignment field 312 of the data subset information $300_i$ with the determined available processing system $200_i$. The assigned available processing system $200_i$ is notified (at block 606) of the partially sorted data subset to continue sorting.

If (at block 602) there is no one available processing system with sufficient computational resources to continue sorting the partially sorted data subset 126, then the sort manager processing system $200_M$ divides (at block 608) the partially sorted data subset into a plurality of partial data subsets comprising records in the partially sorted data subset, such as partitions of the data subset created to recursively sort subsets of the data set. Available processing systems $200_i$ are selected (at block 610) with highest available computational resources to process partial data subsets. The selected available processing systems $200_i$ may have available computational resources that fall below a computational resource threshold required for processing a full data subset 126. Further, the unavailable processing may be selected to process a partial data subset having available computational resources sufficient to sort a partial data subset even if insufficient to be allowed to sort an entire data subset. The sort manager processing system $200_M$ notifies (at block 612) each of the selected processing systems $200_i$ to continue sorting one of the partial data subsets. Upon receiving (at block 614) notification from the processing systems $200_i$ assigned to complete processing the partial data subsets, the sort manager processing system $200_M$ merges the sorted partial data subsets into a sorted data subset 128. Indication is made (at block 616) in the data subset information $300_i$ for the data subset that sort is complete and a lock is applied to the completed data subset 128 in the shared storage 104

With the embodiment of FIG. 6, if a processing system is no longer available to continue processing a data subset, then the data subset 126 may be divided into multiple partial data subsets to be sorted by other available processing systems $200_i$. This allows the sorting to continue even if some of the processing systems assigned data subsets 126 fail or are no longer available due to computational resource shortages. Further, with the described embodiments, even available processing systems that do not have available computational resources sufficient to process a full data subset may be assigned a partial data subset to sort because the partial data subset requires less computational resources to sort than a full data subset.

Figure 7:
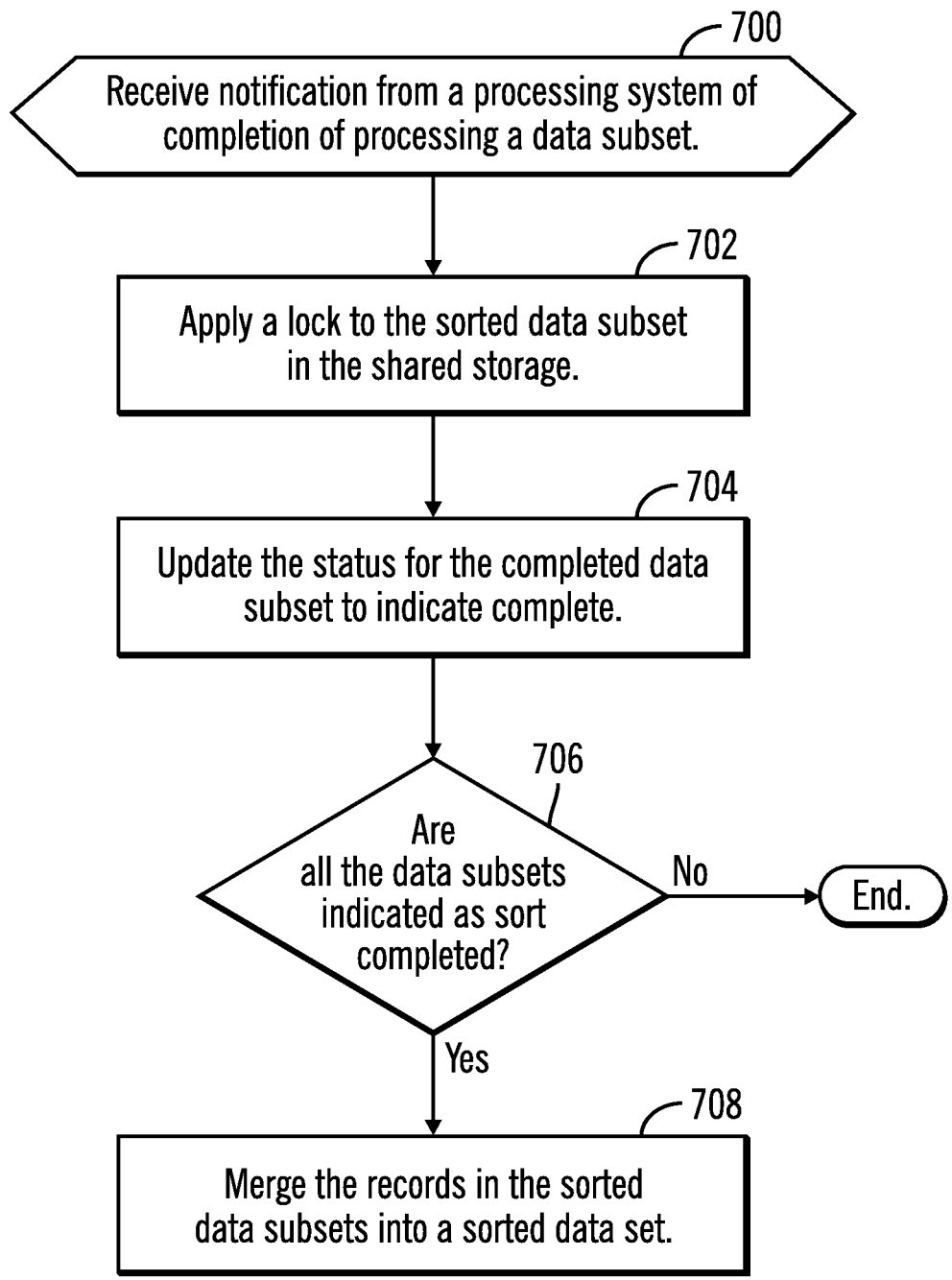
FIG. 7 illustrates an embodiment of operations performed by the sort manager processing system to process a notification from a processing system of completion of processing a data subset.

FIG. 7 illustrates an embodiment of operations performed by the by the sort manager processing system $200_M$ executing the sort manager code 210 to process a notification from a processing system $200_i$ assigned to process a data subset 126 that the sorting completed. Upon receiving (at block 700) notification of completion of sorting a data subset 126 resulting in a sorted data subset 128, a lock is applied (at block 702) to the sorted data subset 128 in the shared storage 104 and the status 314 in the data subset information $300_i$ for the sorted data subset 128 is indicated (at block 704) as complete. If (at block 706) all the data subsets are indicated as sorted, then the records in the sorted data subsets 128 are merged (at block 708) into a sorted data set 130. If (at block 706) all the data subsets 126 are not indicated as sorted, then control ends.

With the embodiment of FIG. 7, the sort manager processing system $200_M$ merges all the sorted data subsets 128 when sorting is completed, and returns control to the application process that initiated the sort.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the processing systems $200_1$, $200_2$ . . . $200_n$, $200_i$ and the coupling facility processor 106 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

Figure 8:
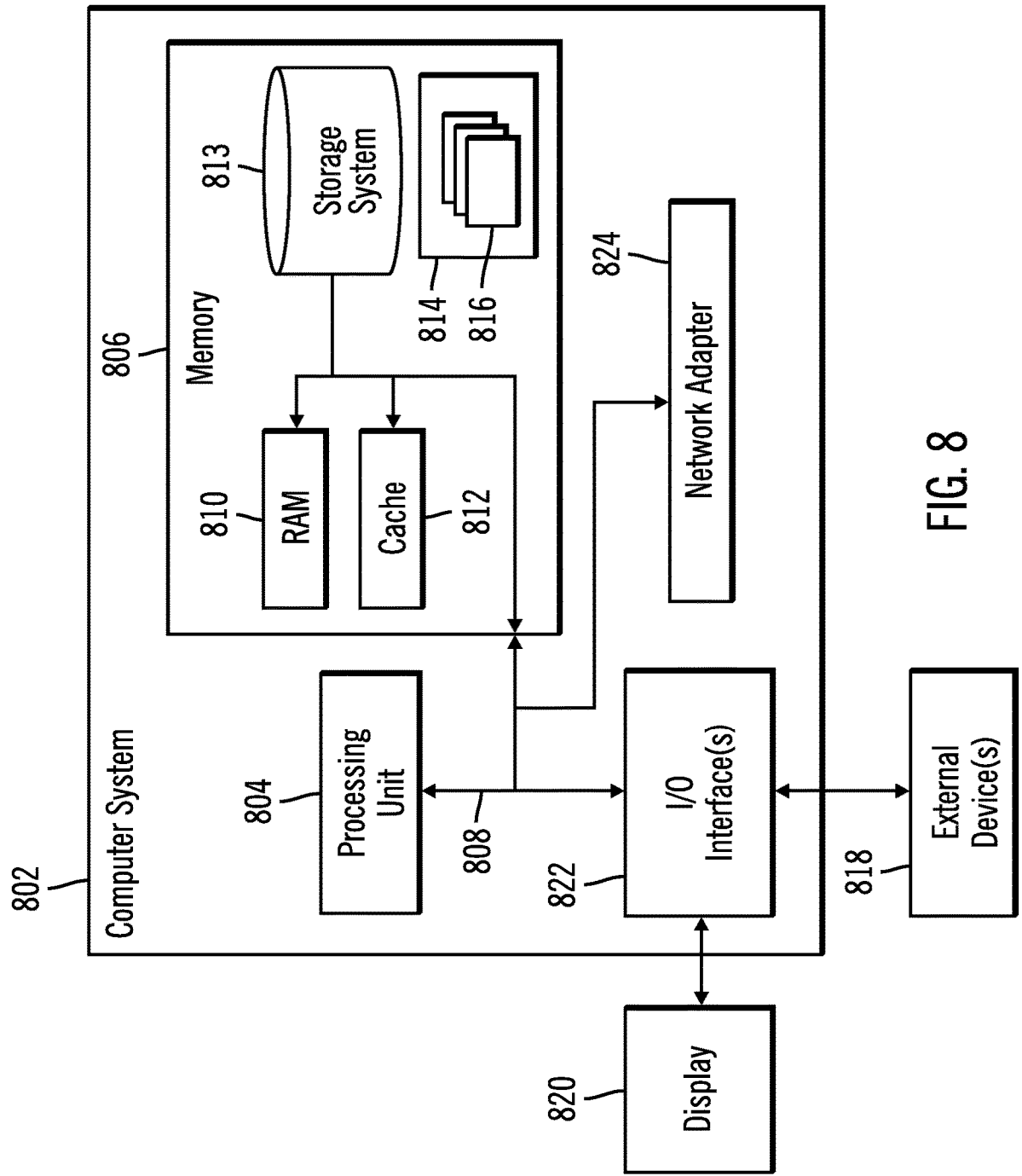
FIG. 8 illustrates an embodiment of a computer architecture used with described embodiments.

As shown in FIG. 8, the computer system/server 802 is shown in the form of a general-purpose computing device. The components of computer system/server 802 may include, but are not limited to, one or more processors or processing nodes 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing nodes, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for sorting a data set with a plurality of processing systems, the computer program product comprising a computer readable storage medium having computer readable program code embodied therein that is executable to perform operations, the operations comprising:
   determining processing systems to perform a sort of records in a data set;
   dividing the data set into data subsets, each data subset comprising a portion of the records of the data set;
   notifying each of the determined processing systems of a data subset to sort;
   in response to receiving notifications from the determined processing systems that the records in the data subsets have been sorted, updating status of the sorting of the data subsets as completed; and in response to the status of the data subsets being completed, merging the sorted data subsets into a sorted data subset comprising the records of the data set sorted.

2. The computer program product of claim 1, wherein the operations further comprise:
sending a resource query command to the processing systems to determine available computational resources in the processing systems, wherein the determining processing systems to perform the sort of records comprises determining processing systems responding to the resource query command with indication of available computational resources satisfying an available computational resource threshold.

3. The computer program product of claim 1, wherein the operations further comprise:
in response to determining an unavailable processing system comprising one of the processing systems receiving the data subset to sort is no longer available to continue sorting the data subset, selecting a processing system, other than the unavailable processing system, to continue sorting the data subset comprising a partially sorted data subset; and
notifying the selected processing system of the data subset to sort.

4. The computer program product of claim 3, wherein the data subset that was partially sorted by the unavailable processing system is stored in a shared storage system shared by the processing systems, wherein the selected processing system continues sorting the partially sorted data subset from a point where the unavailable processing system ceased sorting data records in the data subset.

5. The computer program product of claim 3, wherein the unavailable processing system became unavailable in response to determining that available computational resources at the processing system are below a computational resource threshold.

6. The computer program product of claim 1, wherein the operations further comprise:
in response to determining an unavailable processing system comprising one of the processing systems receiving a data subset is no longer available to continue sorting the data subset, performing:
dividing the data subset assigned to the unavailable processing system into a plurality of partial data subsets comprising records in the data subset;
selecting a plurality of the processing systems having threshold available computational resources; and
notifying each of the selected plurality of processing systems to continue sorting one of the partial data subsets.

7. The computer program product of claim 6, wherein the operations further comprise:
in response to receiving notification from the selected plurality of processing systems that the records in the partial data subsets have been sorted, merging the sorted partial data subsets into a sorted data subset set comprising the records of the divided data subset.

8. The computer program product of claim 6, wherein the partial data subsets comprise partitions of the data subset recursively created by the unavailable processing system when sorting the data subset.

9. The computer program product of claim 1, wherein a sort manager processing system of the processing systems performs the operations of the determining processing systems to perform the sorting, dividing the data set into data subsets, notifying each of the determined processing systems, and merging the sorted data subsets.

10. The computer program product of claim 1, wherein a shared storage is accessible to the processing systems, wherein the operations further comprise:
storing the data subsets in a shared storage for access by the processing systems assigned the data subsets, wherein the processing systems read the data subsets into local storage to sort and store the sorted data subsets in the shared storage, wherein the merging is performed on the sorted data subsets in the shared storage; and
applying a lock to the sorted data subsets in the shared storage to prevent modifications by unauthorized processing systems.

11. A system for sorting a data set, comprising:
a plurality of processing systems;
a sort manager processing system executing program code to perform operations, the operations comprising:
determining processing systems of the plurality of processing systems to perform a sort of records in a data set;
dividing the data set into data subsets, each data subset comprising a portion of the records of the data set;
notifying each of the determined processing systems of a data subset to sort;
in response to receiving notifications from the determined processing systems that the records in the data subsets have been sorted, updating status of the sorting of the data subsets as completed; and
in response to the status of the data subsets being completed, merging the sorted data subsets into a sorted data subset comprising the records of the data set sorted.

12. The system of claim 11, wherein the operations performed by the sort manager processing system further comprise:
sending a resource query command to the processing systems to determine available computational resources in the processing systems, wherein the determining processing systems to perform the sort of records comprises determining processing systems responding to the resource query command with indication of available computational resources satisfying an available computational resource threshold.

13. The system of claim 12, wherein the operations performed by the sort manager processing system further comprise:
in response to determining an unavailable processing system comprising one of the processing systems receiving the data subset to sort is no longer available to continue sorting the data subset, selecting a processing system, other than the unavailable processing system, to continue sorting the data subset comprising a partially sorted data subset; and
notifying the selected processing system of the data subset to sort.

14. The system of claim 12, wherein the operations performed by the sort manager processing system further comprise:
in response to determining an unavailable processing system comprising one of the processing systems receiving a data subset is no longer available to continue sorting the data subset, performing:
dividing the data subset assigned to the unavailable processing system into a plurality of partial data subsets comprising records in the data subset;

selecting a plurality of the processing systems having threshold available computational resources; and notifying each of the selected plurality of processing systems to continue sorting one of the partial data subsets.

15. The system of claim 12, wherein a shared storage is accessible to the processing systems, wherein the operations performed by the sort manager processing system further comprise:

storing the data subsets in a shared storage for access by the processing systems assigned the data subsets, wherein the processing systems read the data subsets into local storage to sort and store the sorted data subsets in the shared storage, wherein the merging is performed on the sorted data subsets in the shared storage; and applying a lock to the sorted data subsets in the shared storage to prevent modifications by unauthorized processing systems.

16. A method for sorting a data set with a plurality of processing systems, comprising:

determining processing systems to perform a sort of records in a data set;

dividing the data set into data subsets, each data subset comprising a portion of the records of the data set;

notifying each of the determined processing systems of a data subset to sort;

in response to receiving notifications from the determined processing systems that the records in the data subsets have been sorted, updating status of the sorting of the data subsets as completed; and in response to the status of the data subsets being completed, merging the sorted data subsets into a sorted data subset comprising the records of the data set sorted.

17. The method of claim 16, further comprising:

sending a resource query command to the processing systems to determine available computational resources in the processing systems, wherein the determining processing systems to perform the sort of records comprises determining processing systems responding to the resource query command with indication of available computational resources satisfying an available computational resource threshold.

18. The method of claim 16, further comprising:

in response to determining an unavailable processing system comprising one of the processing systems receiving the data subset to sort is no longer available to continue sorting the data subset, selecting a processing system, other than the unavailable processing system, to continue sorting the data subset comprising a partially sorted data subset; and notifying the selected processing system of the data subset to sort.

19. The method of claim 16, further comprising:

in response to determining an unavailable processing system comprising one of the processing systems receiving a data subset is no longer available to continue sorting the data subset, performing:

dividing the data subset assigned to the unavailable processing system into a plurality of partial data subsets comprising records in the data subset;

selecting a plurality of the processing systems having threshold available computational resources; and notifying each of the selected plurality of processing systems to continue sorting one of the partial data subsets.

20. The method of claim 16, wherein a shared storage is accessible to the processing systems, further comprising:

storing the data subsets in a shared storage for access by the processing systems assigned the data subsets, wherein the processing systems read the data subsets into local storage to sort and store the sorted data subsets in the shared storage, wherein the merging is performed on the sorted data subsets in the shared storage; and applying a lock to the sorted data subsets in the shared storage to prevent modifications by unauthorized processing systems.

* * * * *